US012701003B2

(12) United States Patent
Wen et al.

(10) Patent No.: US 12,701,003 B2
(45) **Date of Patent: \*Aug. 4, 2026**

(54) MACHINE LEARNING FOR AUTOMATIC IDENTIFICATION OF POINTS OF INTEREST FOR SIDE CHANNEL LEAKAGE

(71) Applicant: ANSYS, INC., Canonsburg, PA (US)

(72) Inventors: Jimin Wen, Pleasanton, CA (US); Hua Chen, Chengdu (CN); Deqi Zhu, San Jose, CA (US); Lang Lin, Cupertino, CA (US); Norman Chang, Fremont, CA (US); Chia-Wei Chen, Arcadia, CA (US)

(73) Assignee: ANSYS, INC., Canonsburg, PA (US)

( * ) Notice: Subject to any disclaimer, the term of this patent is extended or adjusted under 35 U.S.C. 154(b) by 68 days.

This patent is subject to a terminal disclaimer.

(21) Appl. No.: 18/957,349

(22) Filed: Nov. 22, 2024

(65) Prior Publication Data

US 2025/0088358 A1     Mar. 13, 2025

Related U.S. Application Data

(63) Continuation of application No. 17/498,399, filed on Oct. 11, 2021, now Pat. No. 12,177,349.

(Continued)

(51) Int. Cl.
| | |
|---|---|
| *H04L 29/06* | (2006.01) |
| *G06N 3/08* | (2023.01) |
| *H04L 9/32* | (2006.01) |

(52) U.S. Cl.
CPC ................................... *H04L 9/32* (2013.01);
*G06N 3/08* (2013.01)

(58) Field of Classification Search
CPC . H04L 9/32; G06N 3/08; G06N 3/045; G06N 3/047; G06N 3/048; G06N 3/084
See application file for complete search history.

(56) References Cited

U.S. PATENT DOCUMENTS

| | | | |
|---|---|---|---|
| 11,301,608 B2 * | 4/2022 | Lin | G06F 21/72 |
| 11,880,456 B1 * | 1/2024 | Zhu | G06F 21/556 |

(Continued)

FOREIGN PATENT DOCUMENTS

| | | |
|---|---|---|
| NL | 2025907 | 6/2020 |

OTHER PUBLICATIONS

Hettwer et al., "Deep Neural Network Attribution Methods for Leakage Analysis and Symmetric Key Recovery," howpublished, url = {https://eprint .lacr.org/2019/143}, (Year: 2019).

(Continued)

*Primary Examiner* — Harunur Rashid

(74) *Attorney, Agent, or Firm* — WOMBLE BOND DICKINSON (US) LLP

(57)     ABSTRACT

Methods, machine readable media and systems for evaluating, through one or more simulations, the leakage of sensitive data in an integrated circuit, such as cryptographic data or keys, are described. The embodiments can use machine learning models, such as one or more neural networks to generate one or more leakage related scores for each portion in a set of portions of the cryptographic data. In one embodiment, leakage data associated the first set of POIs with one or more neural networks is processed by the one or more neural networks to identify the POIs that leak the most and determine one or more scores for each portion in the set of portions of the cryptographic data.

18 Claims, 8 Drawing Sheets

Related U.S. Application Data

(60) Provisional application No. 63/189,007, filed on May 14, 2021.

(56) References Cited

U.S. PATENT DOCUMENTS

| | | | | |
|---|---|---|---|---|
| 2016/0140274 | A1* | 5/2016 | Wachs | ................... H04L 9/003 |
| | | | | 703/2 |
| 2019/0130101 | A1* | 5/2019 | Chen | ..................... G06F 21/554 |
| 2019/0336096 | A1* | 11/2019 | Itu | ........................ A61B 5/7267 |

OTHER PUBLICATIONS

R.A. Fisher, M.A., "IX. On the Mathematical Foundations of Theoretical Statistics," Nov. 17, 1921, 60 pages.

Jiaqi Ma et al., "Modeling Task Relationships in Multi-task Learning with Multi-gate Mixture-of-Experts," KDD 2018, Aug. 19-23, 2018, 10 pages.

Raman Maini et al., "Study and Comparison of Various Image Edge Detection Techniques," International Journal of Image Processing (IJIP), (vol. 3), Issue (1), Mar. 2009, 12 pages.

Non-Final Office Action dated Oct. 13, 2023 for U.S. Appl. No. 17/498,399, 10 pages.

Final Office Action dated Apr. 25, 2024 for U.S. Appl. No. 17/498,399, 17 pages.

Notice of Allowance dated Aug. 20, 2024 for U.S. Appl. No. 17/498,399, 16 pages.

\* cited by examiner

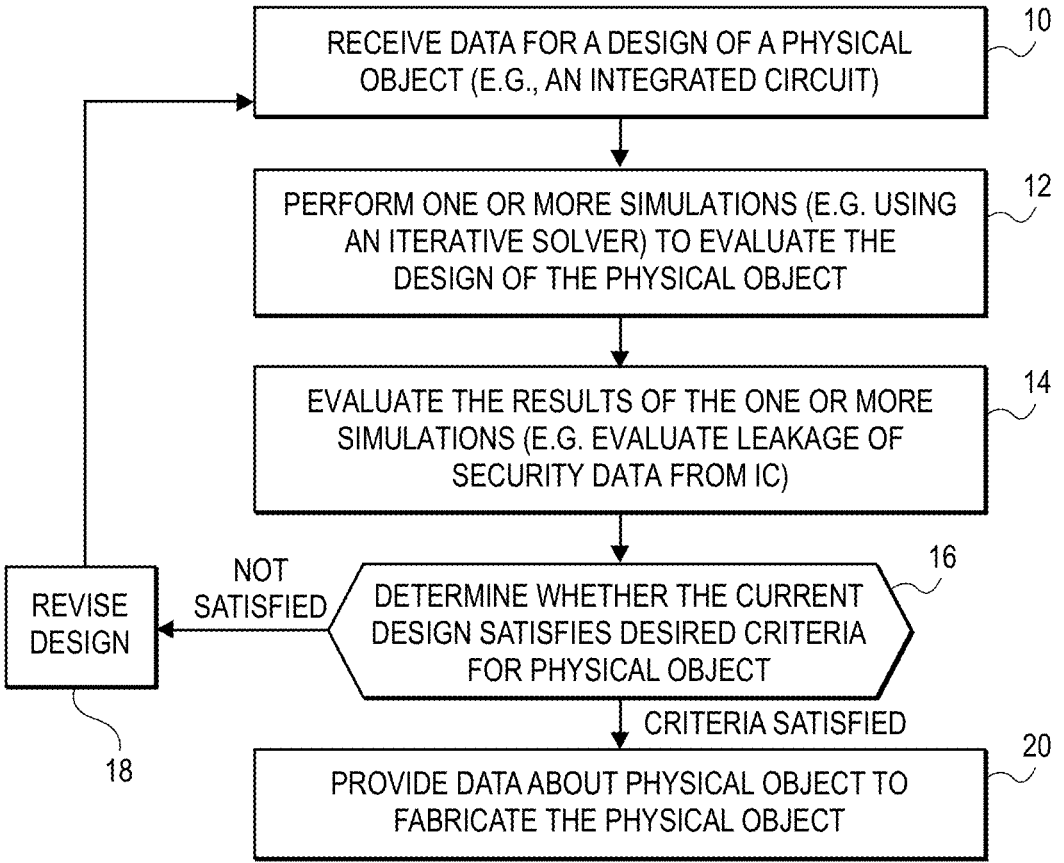

RECEIVE DATA FOR A DESIGN OF A PHYSICAL
OBJECT (E.G., AN INTEGRATED CIRCUIT) 10

PERFORM ONE OR MORE SIMULATIONS (E.G. USING
AN ITERATIVE SOLVER) TO EVALUATE THE
DESIGN OF THE PHYSICAL OBJECT 12

EVALUATE THE RESULTS OF THE ONE OR MORE
SIMULATIONS (E.G. EVALUATE LEAKAGE OF
SECURITY DATA FROM IC) 14

REVISE
DESIGN

NOT
SATISFIED

DETERMINE WHETHER THE CURRENT
DESIGN SATISFIES DESIRED CRITERIA
FOR PHYSICAL OBJECT 16

18

CRITERIA SATISFIED

PROVIDE DATA ABOUT PHYSICAL OBJECT TO
FABRICATE THE PHYSICAL OBJECT 20

FIG. 1

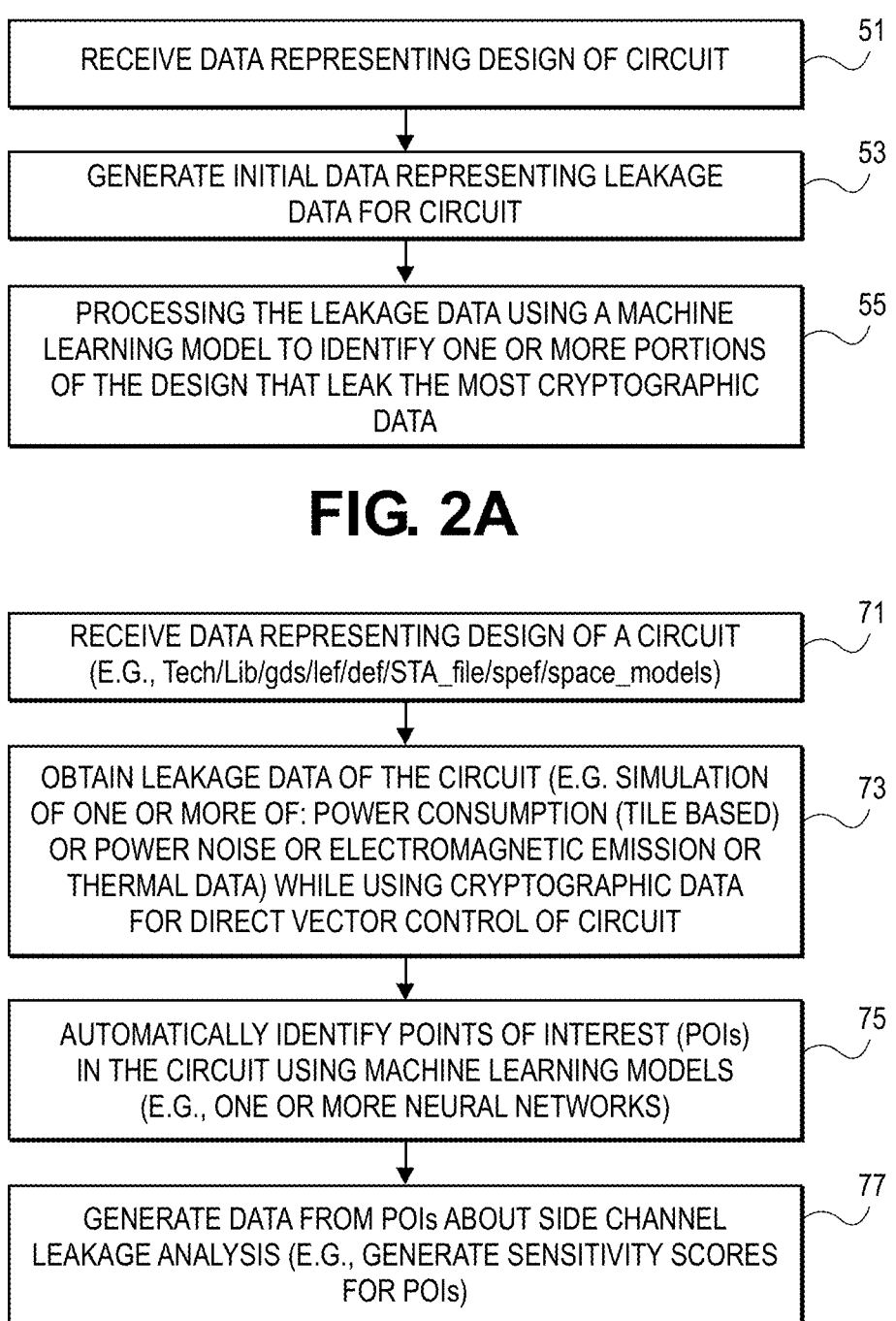

RECEIVE DATA REPRESENTING DESIGN OF CIRCUIT　51

GENERATE INITIAL DATA REPRESENTING LEAKAGE DATA FOR CIRCUIT　53

PROCESSING THE LEAKAGE DATA USING A MACHINE LEARNING MODEL TO IDENTIFY ONE OR MORE PORTIONS OF THE DESIGN THAT LEAK THE MOST CRYPTOGRAPHIC DATA　55

FIG. 2A

RECEIVE DATA REPRESENTING DESIGN OF A CIRCUIT (E.G., Tech/Lib/gds/lef/def/STA_file/spef/space_models)　71

OBTAIN LEAKAGE DATA OF THE CIRCUIT (E.G. SIMULATION OF ONE OR MORE OF: POWER CONSUMPTION (TILE BASED) OR POWER NOISE OR ELECTROMAGNETIC EMISSION OR THERMAL DATA) WHILE USING CRYPTOGRAPHIC DATA FOR DIRECT VECTOR CONTROL OF CIRCUIT　73

AUTOMATICALLY IDENTIFY POINTS OF INTEREST (POIs) IN THE CIRCUIT USING MACHINE LEARNING MODELS (E.G., ONE OR MORE NEURAL NETWORKS)　75

GENERATE DATA FROM POIs ABOUT SIDE CHANNEL LEAKAGE ANALYSIS (E.G., GENERATE SENSITIVITY SCORES FOR POIs)　77

FIG. 2B

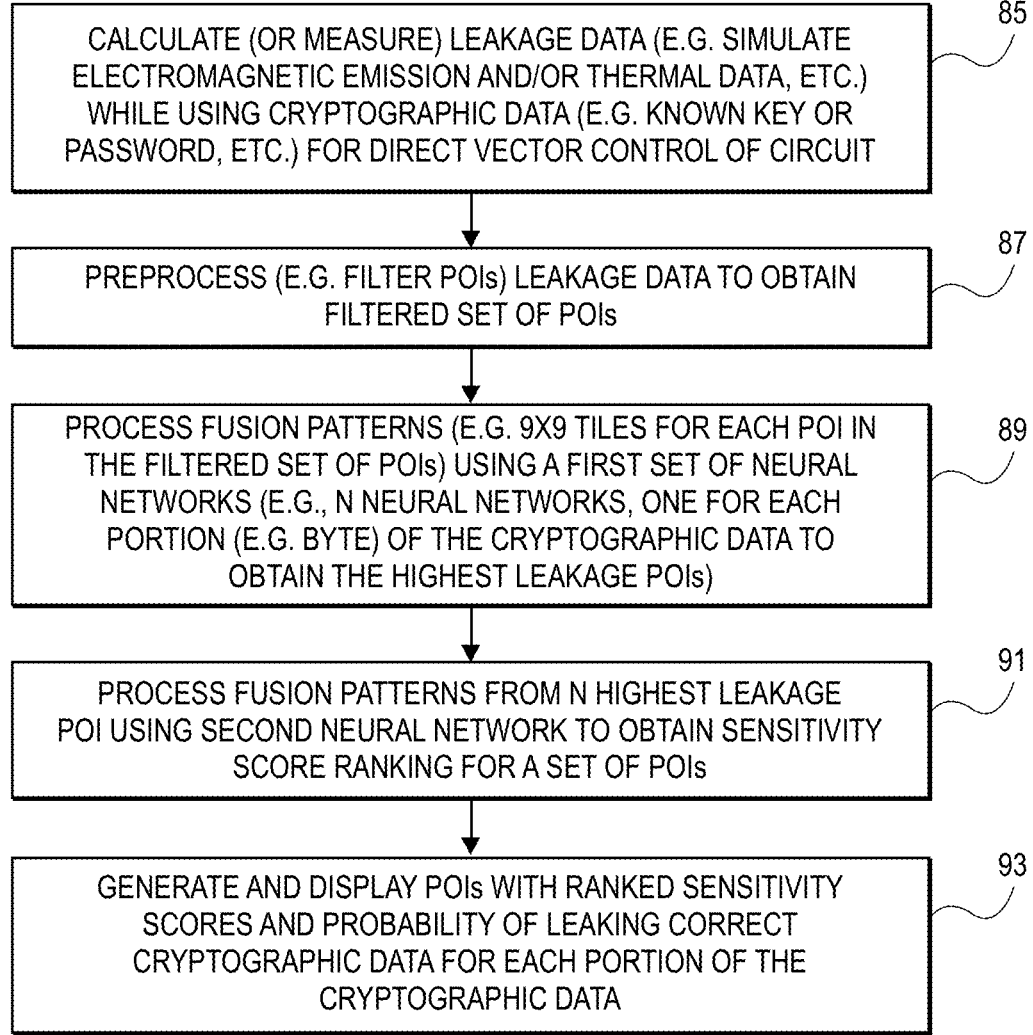

CALCULATE (OR MEASURE) LEAKAGE DATA (E.G. SIMULATE ELECTROMAGNETIC EMISSION AND/OR THERMAL DATA, ETC.) WHILE USING CRYPTOGRAPHIC DATA (E.G. KNOWN KEY OR PASSWORD, ETC.) FOR DIRECT VECTOR CONTROL OF CIRCUIT — 85

PREPROCESS (E.G. FILTER POIs) LEAKAGE DATA TO OBTAIN FILTERED SET OF POIs — 87

PROCESS FUSION PATTERNS (E.G. 9X9 TILES FOR EACH POI IN THE FILTERED SET OF POIs) USING A FIRST SET OF NEURAL NETWORKS (E.G., N NEURAL NETWORKS, ONE FOR EACH PORTION (E.G. BYTE) OF THE CRYPTOGRAPHIC DATA TO OBTAIN THE HIGHEST LEAKAGE POIs) — 89

PROCESS FUSION PATTERNS FROM N HIGHEST LEAKAGE POI USING SECOND NEURAL NETWORK TO OBTAIN SENSITIVITY SCORE RANKING FOR A SET OF POIs — 91

GENERATE AND DISPLAY POIs WITH RANKED SENSITIVITY SCORES AND PROBABILITY OF LEAKING CORRECT CRYPTOGRAPHIC DATA FOR EACH PORTION OF THE CRYPTOGRAPHIC DATA — 93

FIG. 2C

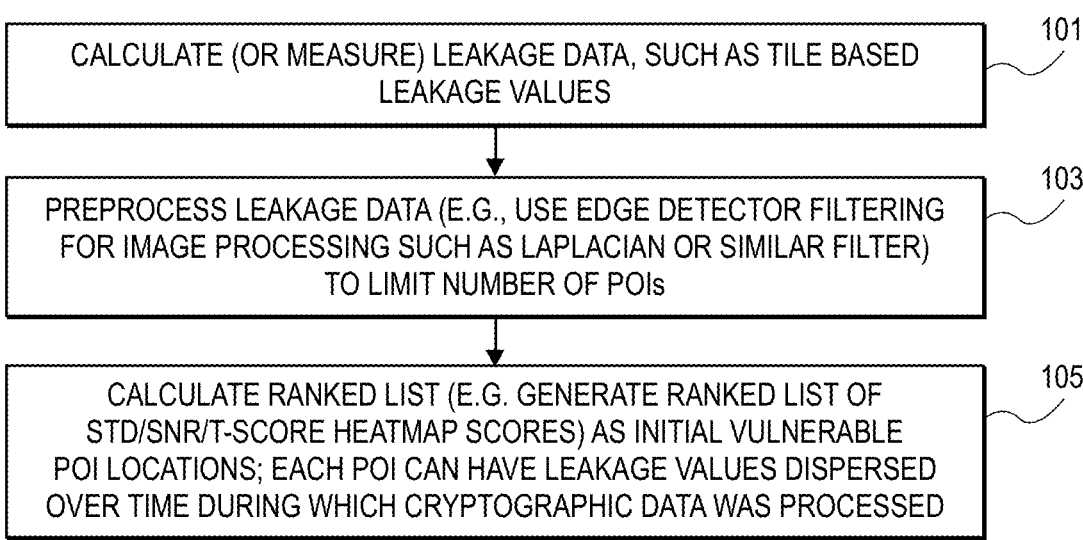

CALCULATE (OR MEASURE) LEAKAGE DATA, SUCH AS TILE BASED LEAKAGE VALUES — 101

PREPROCESS LEAKAGE DATA (E.G., USE EDGE DETECTOR FILTERING FOR IMAGE PROCESSING SUCH AS LAPLACIAN OR SIMILAR FILTER) TO LIMIT NUMBER OF POIs — 103

CALCULATE RANKED LIST (E.G. GENERATE RANKED LIST OF STD/SNR/T-SCORE HEATMAP SCORES) AS INITIAL VULNERABLE POI LOCATIONS; EACH POI CAN HAVE LEAKAGE VALUES DISPERSED OVER TIME DURING WHICH CRYPTOGRAPHIC DATA WAS PROCESSED — 105

FIG. 3A

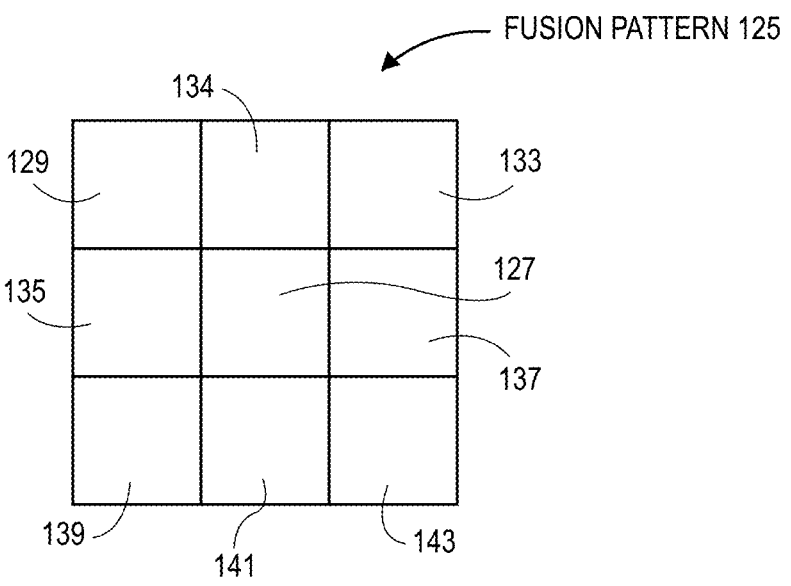

FUSION PATTERN 125

FIG. 3B

MACHINE LEARNING FOR AUTOMATIC IDENTIFICATION OF POINTS OF INTEREST FOR SIDE CHANNEL LEAKAGE

CROSS REFERENCE TO RELATED APPLICATIONS

This application is a continuation of U.S. Non-Provisional application Ser. No. 17/498,399, filed Oct. 11, 2021, which claims the priority benefit of U.S. Provisional Application No. 63/189,007, filed on May 14, 2021, which was incorporated by reference.

BACKGROUND

Side channel attacks on a device, such as a smart phone or credit card or computer, can non-invasively extract sensitive information, such as cryptographic keys or passwords, from the device. There has been a proliferation of such attacks that exploit unintentional leakage through the "side channel" information which includes information derived from power supply noise (e.g., on a power grid of an IC), power consumption, electromagnetic emission (e.g., magnetic field radiation near the surface of the IC), and thermal emission (e.g., on-die temperature profile of the IC). For example, by measuring the dynamic voltage drop or current draw of a device while performing a large number of encryption/decryption operations, the sensitive information of the device can be learned and extracted through statistical correlation analysis. Current methods to detect these leakages during a process for designing a device rely upon hardware techniques that test the device after manufacturing the device, and these tests are performed in laboratories of certified testing services. These tests can be used to cause a redesign of an IC, but only after the IC has been fabricated. Simulations designed to provide side channel leakage analysis require too many potential probing locations and too many traces through the design to provide accurate and good coverage for such analysis.

SUMMARY OF THE DESCRIPTION

The embodiments described herein can provide techniques for simulating and testing a design for sensitive data leakage before the design is fabricated and can do so with methods that reduce usage of computational resources thereby improving the computer technology used to do these simulations. These embodiments can allow the simulation to be used to cause a specific redesign based upon the simulation so that the redesign is informed by the simulation in ways that reduce the leakage of sensitive data (such as cryptographic keys or other data or passwords, etc.).

A method according to one embodiment can include the following operations: generating initial data that comprises at least one of: (1) simulated leakage data from a simulated circuit or (2) measured leakage data from a circuit that processes one or more cryptographic data, the generating performed while the simulated circuit or the circuit processes the cryptographic data, and wherein the generating produces a first set of points of interest (POIs) in the simulated circuit or the circuit; and processing leakage data associated the first set of POIs with one or more neural networks to identify the POIs that leak the most and determine one or more scores for each portion in a set of portions of the cryptographic data. In one embodiment, at least a portion of the cryptographic data is provided through direct vector control of the simulated circuit. In one embodiment, the simulated leakage data comprises a set of one or more of: (1) power noise data, (2) thermal data, (3) electromagnetic emission data, or (4) tile based power data, and wherein the simulated leakage data includes temporal samplings during processing of the cryptographic data and spatial samplings over the circuit.

In one embodiment, the method can further include: filtering the initial data to derive the first set of POIs which is less than all POIs found in the circuit, and this filtering can include an image processing edge detection. In one embodiment, the method can further include: determining, within each POI in the first set of POIs, a coupling impact of neighboring tiles relative to a center tile in each POI; and selecting a fusion pattern for each POI based on the determined coupling impact, wherein the fusion pattern for each POI is used to statistically aggregate leakage data from each tile in the fusion pattern. This selection of a fusion pattern can be adaptive (based upon the coupling impact) so that one set of tiles uses a first fusion pattern and another set of tiles uses a second fusion pattern (that is different than the first fusion pattern due to different coupling impacts).

In one embodiment, the one or more neural networks comprise a first set of neural networks, the first set of neural networks including N neural networks, and each of the N neural networks being trained on the leakage data associated with the first set of POIs, and each of the N neural networks being trained on a portion of the cryptographic data, and wherein there are N portions of the cryptographic data, and wherein leakage data from a set of tiles around a tile in the first set of POIs is statistically aggregated as an input as leakage data for the tile. Further in one embodiment, the one or more neural networks also comprise a second neural network that is configured as a multi-gate mixture-of-experts (MMoE) neural network that receives leakage data of a set of highest leakage POIs, the set of highest leakage POIs identified from the first set of neural networks, and the second neural network generates concurrently a sensitivity score for each of the N portions. In one embodiment, the set of highest leakage POIs is determined from a set of weights in each neural network in the first set of neural networks, and there are N POIs in the set of highest leakage POIs. In one embodiment, the one or more scores comprise a set of N probability scores produced by the second set of neural networks, each of the N probability scores indicating a probability that a portion of a correct cryptographic data will be leaked by the circuit, and the one or more scores further comprise the sensitivity score for each portion of the N portions of the cryptographic data, each sensitivity score indicating a leakage sensitivity of a corresponding POI. In one embodiment, the one or more neural networks can determine the one or more scores without requiring layout data about the circuit; in other words, the outputs from the one or more neural networks do not depend on information about layout data or information about the design of a cryptographic processing block (such as a secure enclave) in the IC.

In another aspect, an embodiment using a trained model (e.g., one or more trained neural networks) can perform a method that includes the following operations: receiving data representing a design of a circuit; generating data that comprises at least one of: (1) simulated leakage data from a simulated circuit that represents the design or (2) measured leakage data from the circuit that processes one or more cryptographic data, the producing performed while the simulated circuit or the circuit processes the cryptographic data, and wherein the generating produces a first set of points of interest (POIs) in the simulated circuit or the circuit; and processing leakage data associated the first set of POIs with one or more trained neural networks to identify the POIs that leak the most and determine one or more scores for each portion in a set of portions of the cryptographic data. In one embodiment, at least a portion of the cryptographic data is provided through direct vector control of the simulated circuit, and wherein the simulated leakage data comprises a set of one or more of: (1) power noise data, (2) thermal data, (3) electromagnetic emission data, or (4) tile based power data, and wherein the simulated leakage data includes temporal samplings during processing of the cryptographic data and spatial samplings over the circuit. In one embodiment, the one or more neural networks comprise a first set of neural networks, the first set of neural networks including N neural networks, and each of the N neural networks being trained on the leakage data associated with the first set of POIs, and each of the N neural networks being trained on a portion of the cryptographic data, and wherein there are N portions of the cryptographic data, and wherein leakage data from a set of tiles around a tile in the first set of POIs is statistically aggregated as an input as leakage data for the tile. In one embodiment, the one or more neural networks also comprise a second neural network that is configured as a multi-gate mixture-of-experts neural network that receives leakage data of a set of highest leakage POIs, and the set of highest leakage POIs is identified from the first set of neural networks, and the second neural network generates concurrently a sensitivity score for each of the N portion. In one embodiment, the set of highest leakage POIs is determined from a set of weights in each neural network in the first set of neural networks, and there are N POIs in the set of highest leakage POIs, and wherein the one or more scores comprise a set of N probability scores produced by the first set of neural networks, each of the N probability scores indicating a probability that a portion of a correct cryptographic data will be leaked by the circuit, and the one or more scores further comprise the sensitivity score for each portion of the N portions of the cryptographic data, each sensitivity score indicating a leakage sensitivity of a corresponding POI.

In one embodiment, a machine learning based set of algorithms can be used to automatically identify the most leakage sensitive POIs and rank them and provide sensitivity scores for these most leakage sensitive POIs and provide probability of leakage scores, and this set of algorithms can provide accurate side channel leakage analysis with fewer POIs and fewer traces than conventional approaches without a loss of accuracy while also providing good coverage of the entire design. This set of algorithms can detect the most leakage sensitive POIs and obtain their leakage contribution at the same time in a computationally efficient manner.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods and such a data processing system can be considered a simulation system.

The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

FIG. 1 shows a method that can be used with the one or more embodiments described herein.

FIG. 2A is a flow chart that shows a general example of an embodiment described herein.

FIG. 2B is a flow chart that depicts a method according to one or more embodiments described herein.

FIG. 2C is a flow chart that illustrates another method according to an embodiment described herein.

FIG. 3A shows a method for preprocessing leakage data according to an embodiment described herein.

FIG. 3B shows an example of a fusion pattern that can be used to statistically aggregate a set of tiles around a tile in a POI.

DETAILED DESCRIPTION

Figure 4A:
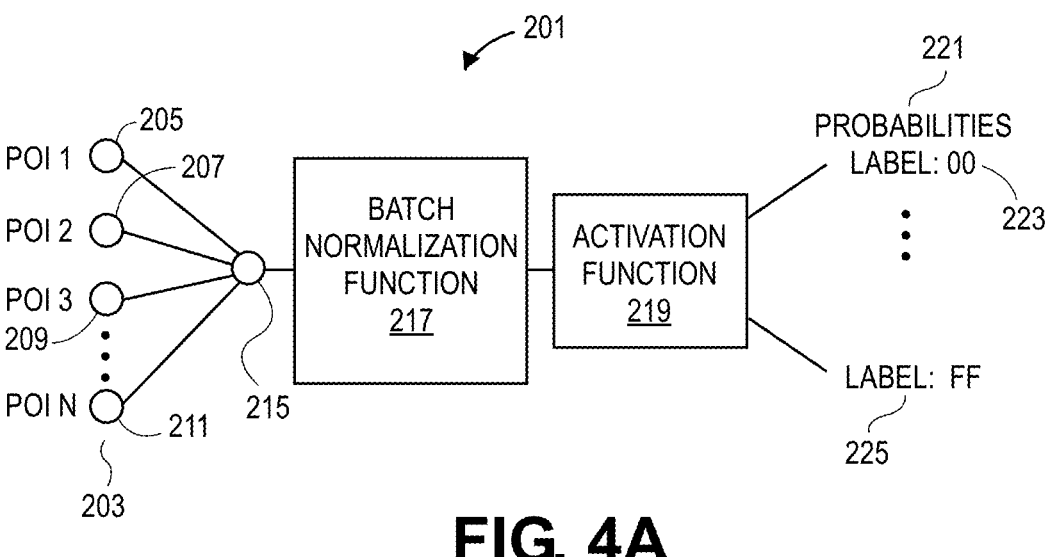
FIG. 4A shows an example of a neural network in a set of neural networks according to an embodiment described herein.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments described herein can be used in simulations (or physical measurements) of electrical circuits (for example, an IC or a plurality of ICs on a circuit board or set of circuit boards) in order to determine whether a particular design of the circuit satisfies particular requirements for the circuit or system containing the circuit. For example, there might be certain design requirements for protecting sensitive data, such as passwords and other cryptographic data and sensitive data, in a device. FIG. 1 shows a method in which these design requirements can be tested relative to a particular design of an IC or physical system which is being simulated. In operation 10 of FIG. 1, a data processing system can receive data about a design for a particular IC or other electrical circuit. The data can be created in CAD software on a data processing system, and the data can include information about the gates to be used to fabricate the IC, such as cell library information about the gates, etc. Then in operation 12, the data processing system can perform one or more simulations (such as simulations based on dynamic current models) to evaluate the design of the IC. These simulations can use the aspects and embodiments described herein. In one embodiment, the data processing system can perform simulations by using a solver such as an iterative solver which converges upon a solution that specifies parameters relative to the IC in the simulation. For example, the design may be subjected to various different possible cryptographic parameters or keys in an attack to break the cryptographic system and expose the keys used to protect the system or expose other sensitive data. In operation 14, the designer can evaluate the results of one or more simulations to determine whether the design of the IC satisfies certain desired criteria for the design. For example, a designer can determine whether it is too easy to detect the one or more keys (or other sensitive data) in the device from current results. This determination is shown in operation 16. If the one or more criteria is satisfied, then the designer in operation 20 can provide data about the circuit to allow the fabrication or manufacture of the IC or system. For example, if the one or more criteria is satisfied, one or more CAD files can be produced that describe how to build the IC or system. If the criteria are not satisfied as determined in operation 16, the designer can revise the design in operation 18 (for example, by applying known countermeasures on identified leaky instances or by changing sizes and/or quantity of the power distribution network, etc.) and repeat the process by performing additional further simulations to evaluate the redesigned circuit. Thus, the embodiments described herein can be used repeatedly during the redesigning process to evaluate the adequacy of the countermeasures that can be applied during the redesigning process. This can be repeated until the desired criteria are achieved for the circuit.

The embodiments described herein improve upon standard techniques for verifying the level of protection afforded to sensitive data (such as cryptographic keys) by using techniques that improve the speed of simulations and reduce the computational complexity of the simulations, thereby improving the operation of a data processing system (e.g., a computer) performing the simulations and other operations. Moreover, these techniques provide more accurate results more quickly by using actual (known) switching vectors ("direct vector control") for a portion of the design that contains the security sensitive blocks (such as gates and other logic), and these techniques can limit the analysis to the portion of the design that is most critical to evaluating the level of leakage of sensitive information, such as passwords, hashes, and other information used in cryptographic processing units (such as secure enclave processors, etc.).

Furthermore, these techniques can display information about the design using maps and estimates of the number of simulation traces required to expose the one or more cryptographic secrets or sensitive data. It will be understood that the sensitive data or cryptographic data can be in various different forms or types, including, for example, passwords, account numbers, account names, hashes, keys of various different types (files keys, device keys), device identifiers, etc. The IC that is simulated or measured in the embodiments described herein can use common cryptographic algorithms such as AES or RSA or ECC to process or protect the cryptographic data.

A general example of a method according to one embodiment is shown in FIG. 2A. This method uses a machine learning model to process leakage data in order to compute leakage related data and the computed leakage related data can, for example, be used to identify one or more portions of the IC that leak the most cryptographic data and how sensitive those portions are to leakage (e.g., POI "X" has a very high sensitivity score revealing that it exposes, at very high level, cryptographic data). In operation 51, a simulation system can receive data about the design of the circuit such as the design of one or more ICs. In one embodiment, the data about the design can include information such as one or more SPICE netlists or SPICE models, one or more security netlists, user/designer specified switching vectors for the security netlists, cell power library data, static timing analysis data such as timing windows for switching, power grid design data (such as physical data relating to size and layout of the power grid), other physical design data, and other electrical model data known in the art such as net parasitics and instance timing data, etc. In one embodiment, the data obtained in operation 51 can include a set of pre-characterized multi-state power noise libraries for standard cells, I/O blocks, and IP macro blocks (rather than using transistor level models) to achieve a good trade-off between accuracy and computational efficiency. The designer should (but is not required to) have access to information about the sensitive data such as the location of the data in the layout and values of keys or other data (such as password or device keys or unique device identifier data, etc.). Further, the designer may also have access to information about a security netlist. In operation 53, the simulation system can obtain or generate initial data representing leakage for the circuit being designed. In one embodiment, this generated initial data can be data generated from a simulation of a simulated circuit that processes vectors containing cryptographic data (e.g., user's password, etc.); in other words, the simulation can use direct vector control of the simulation (for at least the known security related portions of the design) to generate leakage data, described further below, that is used to perform a side channel leakage analysis of the circuit being designed. For portions of the design that are outside of the security related portions, the simulation can use random vectors.

In operation 55, the simulation system can process the leakage data using a machine learning model (e.g., a set of one or more neural networks) to generate security related data such as data identifying one or more portions (e.g., points of interest in the design) that leak cryptographic data. This data can be used to revise the design to improve the security of the design using techniques known in the art to hide cryptographic data, including for example redesigning a portion of the power grid of the IC to reduce power noise around a critical POI that is leaking too much.

Another method according to another embodiment is shown in FIG. 2B. In operation 71 in this method, a simulation system receives data representing the design of a circuit, such as a circuit including one or more ICs. This information can include conventional information available to designers of ICs as in known in the art. In one embodiment, the data received in operation 71 can be the same as the data received in operation 51 in FIG. 2A. This received data can include known cryptographic data such as one or more known passwords or keys, etc. In operation 73, the simulation system can obtain leakage data for the circuit; this leakage data may be obtained from physical measurements of an actual fabricated IC or from simulations of a simulated circuit. The examples provided herein will focus on the simulation aspect, but the physical measurements can also be alternatively of cumulatively used. In one embodiment, the simulation can use multiple sets of leakage data including, for example, one or more of: leakage data derived from tile based power consumption simulations, leakage data derived from power grid noise data simulations, leakage data derived from simulations of electromagnetic emission data (e.g., magnetic field emissions from an upper surface of the IC), and leakage data derived from thermal data of temperature profiles over the surface of the IC, etc. One or more or all of these simulations can be used, and these simulations may be performed separately or concurrently. In one embodiment each of these simulations is performed while the circuit (IC) is processing directed vectors containing the cryptographic data so that the simulations are collecting leakage data while the cryptographic data in the directed vectors is being processed; these direct vectors are typically designer specified vector inputs of known data that will be processed during use of the IC (as opposed to random test vectors that can be applied to the rest of the IC during the one or more simulations). For example, a known key can be applied to the simulated IC while the simulated IC performs various processing rounds (over time) in an AES decryption algorithm to decrypt data or unlock a device, etc. and the simulation collects leakage data during this processing. The rest of the IC may use random vectors (also referred to as vectorless inputs) for the simulations of processing operations over time during the simulation of processing in the IC. An example of the use of direct vector control during a side channel leakage analysis is described in U.S. patent application Ser. No. 16/948,158, which was filed on Sep. 4, 2020 by Applicant Ansys, Inc., and this patent application is hereby incorporated herein by reference. Each encryption or decryption round process creates a trace, and the controlled value of the byte of a corresponding security box is the label of this trace which can have 256 possibilities in the case of a byte (8 bits of data). Based on a number (e.g., K) or set of non-repeated temporal traces (such as the multiple rounds of an AES algorithm over time), the leakage data at many locations (e.g., tiles that are each 50 by 50 microns) on the die of the IC) is simulated and collected and stored. A set of such tiles can define the POIs; for example, all tiles (covering the entire surface of an IC) can define the entire set of POIs that will be processed. Thus, simulated leakage data can be created over time (temporal) and over the entire space of the IC (spatial samplings). The above noted U.S. patent application Ser. No. 16/948,158 provides examples of the calculations for creating the simulated leakage data.

Once the leakage data is obtained from operation 73, the simulation system in operation 75 can automatically identify points of interest (POIs) in the circuit using one or more machine learning models, such as one or more neural networks. In one embodiment, in operation 77 the training of the one or more neural networks for a circuit, using known ("truth") cryptographic data for a given circuit, can produce a list of the highest leakage POIs and other desired side channel leakage analysis data for the given circuit. For example, the operations 75 and 77 can find the top M security sensitive locations (e.g., POIs) for each portion of a cryptographic data (e.g., each byte of a 16 byte AES key) that can maximally reveal the key or data in a minimum number of traces. The identified POIs and the leakage analysis data from operations 75 and 77 can be used to guide the measurement based side channel leakage analysis during lab (hardware) testing or help security IC designers fix the potent leakage problems before tape out of an IC design. Further details about implementations of operations 75 and 77 are provided below.

A more specific example of an embodiment is shown in FIG. 2C. In operation 85 of FIG. 2C, a simulation system receives data about a circuit design (e.g., an IC) and then calculates leakage data. The calculation of leakage data can be from one or more simulations of the operation of the circuit (e.g., the IC) while the circuit is processing known cryptographic data (e.g., a key or password, etc.). In one embodiment, the simulation can use multiple sets of leakage data including, for example, one or more of: leakage data derived from tile based power consumption simulations, leakage data derived from power grid noise data simulations, leakage data derived from simulations of electromagnetic emission data (e.g., magnetic field emissions from an upper surface of the IC), and leakage data derived from thermal data of temperature profiles over the surface of the IC, etc. One or more or all of these simulations can be used, and these simulations may be performed separately or concurrently. In one embodiment each of these simulations is performed while the circuit (IC) is processing directed vectors containing the cryptographic data so that the simulations are collecting leakage data while the cryptographic data in the directed vectors is being processed; these direct vectors are typically designer specified vector inputs of known data that will be processed during use of the IC (as opposed to random test vectors that can be applied to the rest of the IC during the one or more simulations). For example, a known key can be applied to the simulated IC while the simulated IC performs various processing rounds (over time) in an AES decryption algorithm to decrypt data or unlock a device, etc. and the simulation collects leakage data during this processing. The rest of the IC may use random vectors (also referred to as vectorless inputs) for the simulations of processing operations over time during the simulation of processing in the IC.

In operation 87, the simulation system can (optionally) preprocess the leakage data to reduce the amount of leakage data (from operation 85) that is processed in subsequent operations in the method shown in FIG. 2C. This reduction in leakage data can limit or filter the number of POIs that are processed in the subsequent operations such that only a filtered or limited set of POIs are processed in these subsequent operations. In one embodiment, this preprocessing operation can allow a method to scan (and obtain leakage data in the simulations in operation 85) over all possible POIs across the entire design (e.g., entire IC) using only about a few thousand traces to determine the most vulnerable or sensitive POIs (e.g., those most likely to leak cryptographic data); thus, the simulations can cover the entire design yet be pruned using this preprocessing operation 87. The method shown in FIG. 3A provides an example of preprocessing that can be used in operation 87; in one embodiment, different filters can be used for different leakage data as described further below.

The leakage data, preprocessed by operation 87 if pre-processing is used, can then be processed by a set of N neural networks in operation 89. An example of one of these N neural networks is shown in FIG. 4A and will be described below. In one embodiment, each of these N neural networks is designed to learn and process data for one of the N portions of the cryptographic data (e.g., N=16 in the case of an AES key that is 128 bits, where each portion is a byte of the 16 bytes in the AES key). Each of these N neural networks identifies, as explained below based upon their trained weights, the highest leakage POI for its respective portion of the cryptographic data (e.g., the $5^{th}$ neural network (NN) for the $5^{th}$ portion identifies the POI that leaks the most relative to all other POIs for the $5^{th}$ portion of the cryptographic data). Also, as explained further below, each of the N neural networks also provides the probability of the correct key value within its respective portion (e.g., the $5^{th}$ NN will indicate the probability of the correct value for the $5^{th}$ portion).

In one embodiment, the leakage data can be organized into groups of tiles for each POI prior to being processed by the set of N neural networks in operation 89. Each of these groups can be referred to as fusion patterns as leakage values for each tile within the group or fusion pattern can be "fused"; this can involve a statistical aggregation such as an average or mean of the leakage values across the fusion pattern. In one embodiment, a common fusion pattern can be an M×M pattern of tiles. In one common pattern, M=9 tiles, such as the fusion pattern 125 shown in FIG. 3B; fusion pattern 125 includes tiles 127 (the center tile), 129, 131, 133, 135, 137, 139, 141, and 143. The value of M may be different for different types of simulated leakage data (e.g., M may be larger for electromagnetic emission simulation leakage data than simulated tile based power consumption leakage data). In one embodiment, the value of M (and the tile size) in a fusion pattern may be adaptively varied based upon a determined coupling impact between adjacent tiles; in other words, tile size and the number of tiles in each fusion pattern may be calculated based upon this coupling impact. Thus the fusion pattern adapts to each group of tiles based upon the coupling impact of adjacent tiles; the more there is coupling impact, the larger M can become. In one embodiment, a decay behavior model in electromagnetic emission data can be used to determine the coupling impact. In one embodiment, the tile size and value of M can be determined by an iterative process that begins with a small value for M and a small tile size and increases one or both and compares simulated leakage data for a fusion pattern before and after the increases to determine if the change is below a threshold (and if it is, then the solution for M and/or tile size is considered converged to an adequate value or set of values). If the change is above the threshold, the value of M (and/or the tile size) can be increased and the comparison process is repeated.

The leakage values in the fusion patterns of the N highest POIs identified by the first set of neural networks in operation 89 in FIG. 2C are provided as inputs to a second neural network in operation 91. In one embodiment, the second neural network can be a multi-gate mixture of experts (MMoE) neural network, such as the MMoE neural network 301 shown in FIG. 5A, which is described further below. The second neural network can then generate a ranked list of sensitivity scores for a set of POIs, such as F POIs (where F is greater than N; in one embodiment, N=16 and F=160 POIs). The F POIs can be associated with known locations on the IC, so the sensitivity scores can be associated with the known locations. An example of a formula for calculating the sensitivity score for a POI is provided below. The second neural network can also, in operation 93, generate a probability of leaking the correct cryptographic data for each portion of the cryptographic data (e.g., a probability of leaking the first byte of an AES key, a probability of leaking the second byte of the AES key, etc.). In one embodiment, the sensitivity score indicates the how vulnerable or weak a POI is, so a very high sensitivity score for a POI indicates the POI is very vulnerable to leaking its associated portion of the cryptographic data. Further information about an embodiment of the second neural network is provided below in conjunction with FIG. 5A.

An example of an embodiment of preprocessing operation 87 in FIG. 2C is provided in the method shown in FIG. 3A. This method can begin by calculating (or measuring) leakage data in operation 101 during a simulation of the operation of the circuit while the circuit processes cryptographic data; the leakage data can be tile based leakage values, such as leakage values derived from a tile based power consumption simulation or a tile based power noise simulation or an electromagnetic emission simulation or a thermal score heat map simulation, or a combination of some or all of these simulations, etc. The leakage values are typically values that include both temporal samplings (over time) and spatial samplings (over space), where the time aspect is a series of processing operations (e.g., AES rounds) over time with one or more data payloads (such as a known cryptographic key), and the spatial aspect is the set of POIs on the circuit observed during each processing operation (which may be referred to as a trace) to collect the leakage data at each POI. Examples of the calculation and collection of leakage data are provided in U.S. patent application Ser. No. 16/948,158, which was filed on Sep. 4, 2020 by Applicant Ansys, Inc., and U.S. patent application Ser. No. 17/445,048, which was filed on Aug. 13, 2021 by Applicant Ansys, Inc., and both of these patent applications are incorporated herein by reference. The calculated leakage data can be preprocessed in operation 103 to limit or filter the number of POIs used in subsequent processing operations. For example, in the case of a thermal score heat map simulation, an edge detection filter algorithm (used for image processing) can be used to limit the POIs, such as a Laplacian filter that detects zero crossings in the second derivative or a gradient based filter such as a Sobel filter (which detects a maximum or minimum in the first derivative). Examples of image edge detection techniques are described in Maini R., Aggarwal H., Study and comparison of various image edge detection techniques, International Journal of Image Processing (ILIP), 3(1):1-11 (2009). Simulated leakage value data from electromagnetic emissions simulation or power noise simulations or tile based power simulations or other simulations can be expressed in image form and hence also preprocessed. The preprocessing can produce a reduced set of POIs; for example, in one embodiment, the initial set of POIs can be over 4000 POIs (e.g., 4800 POIs) and the filtering can reduce the set for further processing to less than 200 POIs (e.g., 100 POIs).

In operation 105, a ranked list of leakage scores based on the leakage data is calculated for the filtered set of POIs; for example, the leakage scores can be based on standard deviation computations or signal-to-noise (SNR) computations or thermal heat map scores over the temporal and spatial samplings in the leakage data. In one embodiment, the SNR can be based on the F-test definition in Fisher, R. A., On the mathematical foundations of theoretical statistics, Phil. Trans. R Soc. Lond., A Containing Papers of a Mathematical or Physical Character, 222, pages 309-368, 1922. In one embodiment, a Hamming weight is used over a collection of traces, where (for example) X is defined as the collection of traces (such as electromagnetic emission traces), and the SNR values can be defined as: SNR=E[Var (X]/Var[E(X)], where E is a mean function and Var is a variance function, so the numerator is a mean of variances and the denominator is a variance of the means (e.g., E(X)=[E(X(Hw=1)), E(X(Hw=2)), . . . . E(X(Hw=N))] and Var(X)=[Var(X(Hw=1)), Var(X(Hw=2)), . . . . Var(X (Hw=N))].

FIG. 4A shows an example of a simple neural network (which can be a deep neural network having more than one hidden layer) that is one of the N neural networks in the set of N neural networks used in operation 89 in FIG. 2C. The neural network 201 along with the rest of the N neural networks in the set can perform operation 89 to determine the N most leaky POIs in the circuit, and the neural network 201 can also provide the probability of the correct key for each possible bit sequence in the byte or portion of the cryptographic data. The neural network 201 includes an input layer 203, a hidden layer 215 that includes a single neuron coupled through weighted connections to input nodes (205, 207, 209, and 211) in the input layer 203, a batch normalization function layer 217, and an activation function layer 219 that provides outputs 221 which include 256 outputs in an embodiment in which the portion of the cryptographic data is a byte (8 bits). The outputs 221 indicate the probability of each possible sequence of bits in the byte; for example, the output 223 indicates the probability that the value of zero (all zeros in the 8 bits) is the correct value for the respective portion of the cryptographic data and output 225 indicates the probability that the value of 255 is the correct value for that respective portion of the cryptographic data. Each of the N portions of the cryptographic data has its own neural network configured as shown in FIG. 4A. For example, the first byte of a 128 bit AES key has one of the N neural networks, the second byte of the AES key has a second NN in the set of N neural networks, a third byte of the AES key has a third NN in the set of N neural networks, etc. In one embodiment, the inputs at the input layer 203 is the filtered and ranked set of POIs from the method shown in FIG. 3A. In one embodiment, this filtered and ranked set of POIs can be the 100 highest ranked POIs from the original set of POIs (which may be over 4000 POIs in an IC). In one embodiment, once the neural network 201 is trained, the weights in the connections between the input layer 203 and the hidden layer 215 can be used to determine the highest leakage POI for the corresponding portion of the cryptographic data. In one embodiment, the connection with the largest weight indicates the highest POI for the portion. For example, if the neural network 201 is trained for the first byte of a 128 bit AES key and the weight (after training is completed) on the connection between input node 205 and the hidden layer 215 is the largest weight among all of the weights in the connections between the input layer 203 and the hidden layer 215, then POI 1 is the POI with the highest leakage for the first byte in the AES key.

Figure 4B:
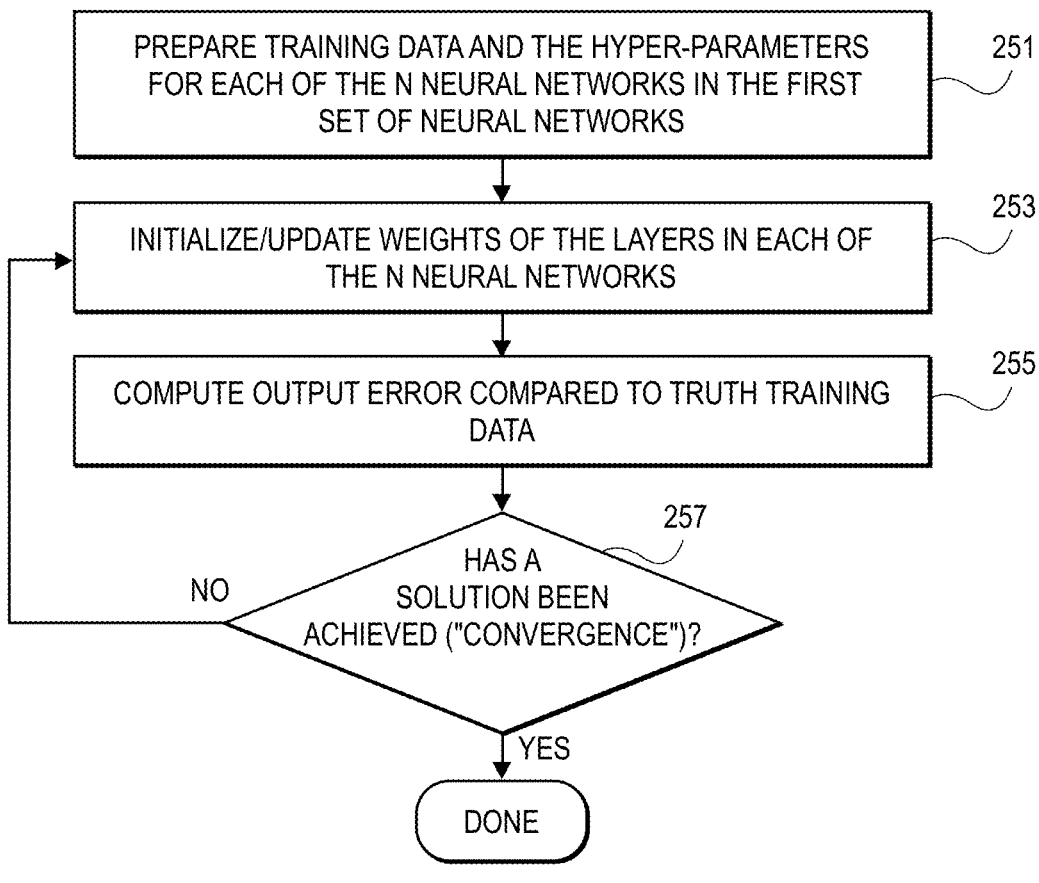
FIG. 4B shows a method, according to one embodiment, to train the neural network shown in FIG. 4A.

Each of the N neural networks used in operation 89 in FIG. 2C can be configured as shown in FIG. 4A and can be trained using conventional training techniques as shown in FIG. 4B. The training process in FIG. 4B can begin in operation 251 by preparing training data (e.g., the true key value(s) and cryptographic processing operation) and hyperparameters for each of the N neural networks, such as neural network 201. Then, in the first instance for training the weights are initialized in operation 253, inputs are applied and the outputs from the neural network are compared, by a discriminator in operation 255, to truth data (e.g., the true key value for the corresponding portion of the cryptographic data). This comparison produces an error value that can be compared to a threshold to determine, in operation 257, whether a solution has converged to an acceptable value. If the error is less than the threshold, then the solution has converged and training is done. On the hand, if the error is greater than the threshold, then the training system reverts back to operation 253 to update the weights in the layers (e.g., using a back propagation process known in the art) and the inputs are applied again and the outputs are compared, by the discriminator, to the truth data and the process continues until the training is completed. Once the set of N neural networks have been trained, their outputs and weights can be used to train the second neural network used in operation 91 in FIG. 2C.

Figure 5A:
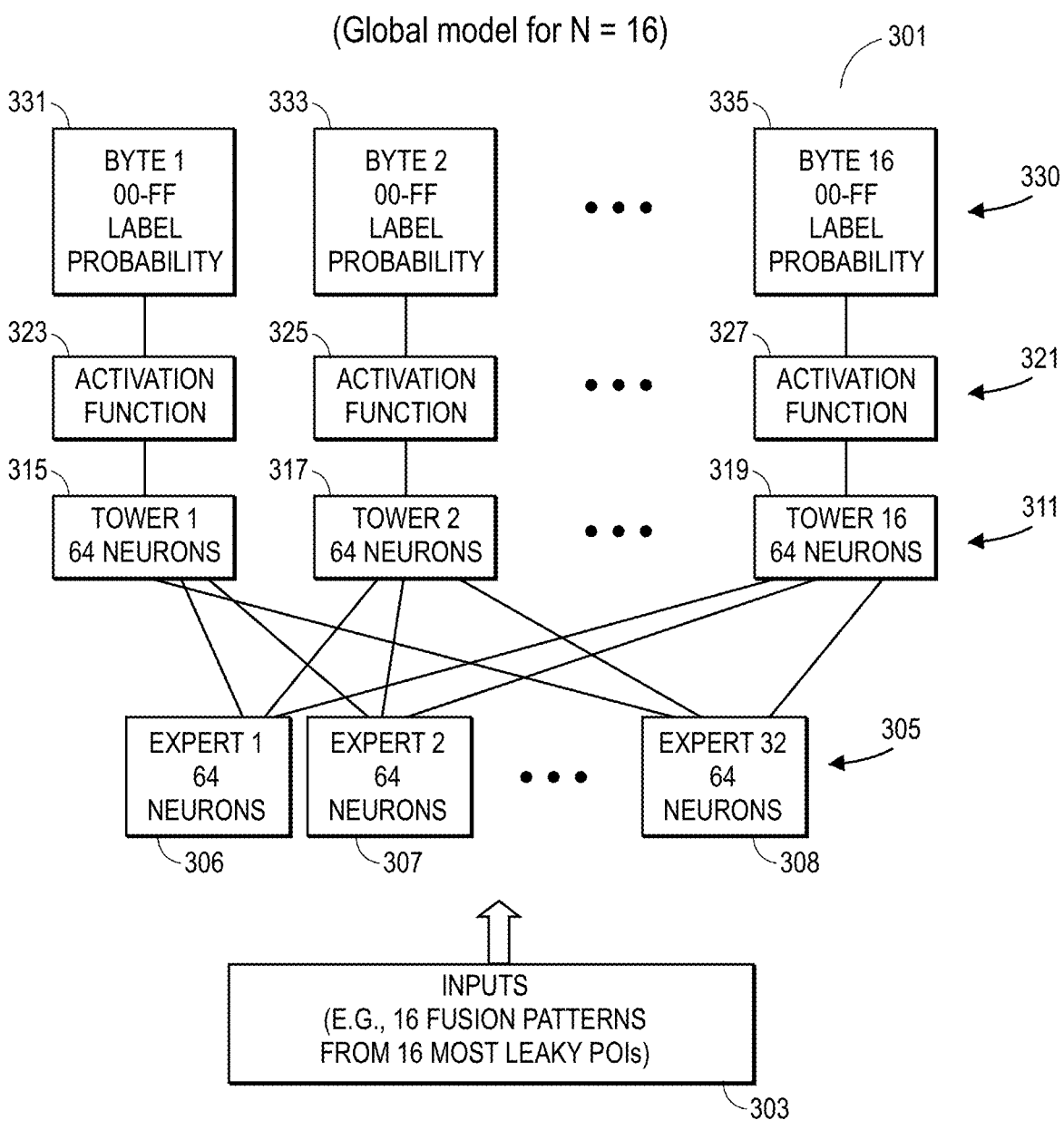
FIG. 5A shows an example of a neural network that can be used with the neural network shown in FIG. 4A according to one embodiment.

FIG. 5A shows an example of an MMoE neural network 301 that can be used to perform operations 91 and 93 in FIG. 2C. The MMoE neural network can perform multi-task learning to provide a global model using the outputs from the first set of neural networks (the set of N neural networks, each of which can be configured as shown in FIG. 4A). The MMoE neural network 301 includes an input layer 303, an expert layer 305, a tower layer 311, an activation function layer 321, and an output layer 330. The MMoE neural network 301 also includes multiple gates based on the architecture for these types of neural networks; a description of this architecture is provided in the following publication: J. Ma, Z. Zhao, X. Yi, J. Chen, L. Hong and E. Chi, Modeling Task Relationships in Multi-task Learning with Multi-gate Mixture-of-Experts, 2018 24th ACM SIGKDD International Conference on Knowledge Discovery & Data Mining, pp. 1930-1939. The input layer 303 in one embodiment receives leakage data from the 16 fusion patterns from the 16 most leaky POIs (16 highest leakage POIs) that were identified by the weights of the 16 neural networks configured as shown in FIG. 4A (the first set of N neural networks). In one embodiment that uses a 9 by 9 fusion pattern (e.g., as shown in FIG. 3B), there are 144 leakage data values (16 fusion patterns each with 9 tiles) that are applied as the inputs to the input layer 303. The input layer 303 applies the inputs to the expert layer 305 which includes 32 sets of 64 neurons (e.g., expert neurons 306, expert neurons 307, and expert neurons 308). The expert layer 305 is in turn coupled to the tower layer 311 which includes 16 sets of 64 neurons (e.g., tower neurons 315, tower neurons 319 and tower neurons 321). The outputs from the tower layer 311 are coupled to the activation layer 321 as shown in FIG. 5A; the activation layer includes 16 activation functions (e.g., activation functions 323, 325, and 327) which produce the 16 outputs to the 16 nodes (including nodes 331, 333, and 335) in the output layer 330. Each output node in the output layer 330 indicates, for the current design of the circuit, a probability of leaking the correct cryptographic data for its portion of the cryptographic data. For example, output node 331 provides a probability of leaking the correct value of the first byte of a 128 bit AES key for the current design of the circuit, and the output node 333 provides a probability of leaking the correct value of the second byte of the 128 bit AES key for the current design of the circuit, and the output node 335 provides a probability of leaking the correct value of the last byte of the 128 bit AES key for the current design of the circuit. These calculated probabilities (e.g., based on Probability=Prediction [Sbox (key$_i$) XOR plaintext]) can be used, as described below, to compute sensitivity scores for each POI in the set of POIs used in the inputs to the input layer 303. For any input trace, due to the direct vector control, the probability of the correct key of each portion is the probability of the label as shown in FIG. 5A.

In one embodiment, a simulation system that uses the one or more embodiments described herein can compute sensitivity scores for POIs based on the probability outputs from the MMoE neural network by using a sensitivity score based on the probability value of each of the POIs. In one embodiment, the sensitivity score may be based on the formula:

$$\text{sensitivity score} = (2 - S_{rank} - S_{trace})/2.$$

This sensitivity score describes the leakage sensitivity of any POI for each portion of the cryptographic data (e.g., each of the 16 bytes of a 128 bit AES key). $S_{rank}$ is the probability ranking of the correct key (e.g., $S_{rank}$=rank/256); so the correct key has the top rank. $S_{rank}$ may be defined by the probability rank divided by 256 in the example of FIG. 5A. In one embodiment, rank=0 for all disclosed cases because the correct key has the top rank. $S_{trace}$ can be defined as the ratio of effective number of traces used to disclose the key divided by the total number of traces in the simulation; this ratio equals 1 for all undisclosed cases, so $S_{trace}$ is used to discriminate the disclosed cases (in which the key is disclosed).

Figure 5B:
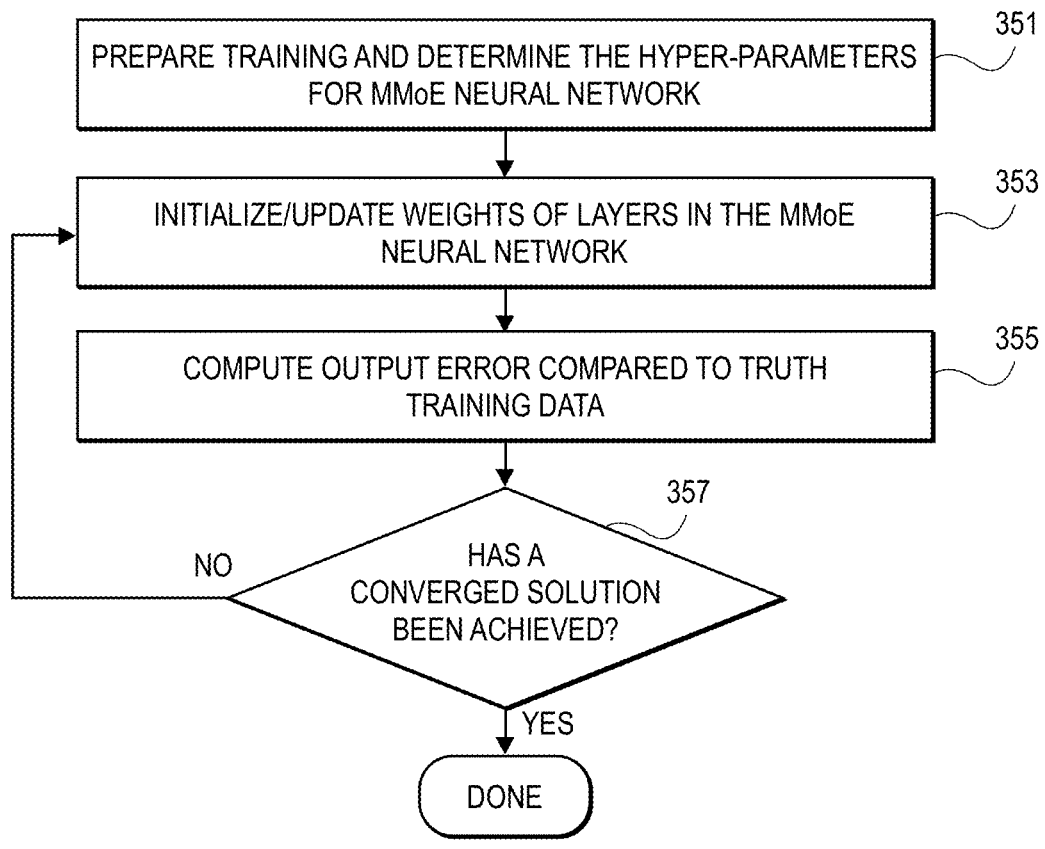
FIG. 5B shows a method, according to one embodiment, to train the neural network shown in FIG. 5A.

The MMoE neural network can be trained using conventional training techniques as shown in FIG. 5B. The training process in FIG. 5B can begin in operation 351 by preparing training data (e.g., the true probability value(s) for associated cryptographic processing operations) and hyper-parameters for the MMoE neural network, such as neural network 301. Then, in the first instance for training, the weights are initialized in operation 353, inputs are applied and the outputs from the neural network are compared, by a discriminator in operation 355, to truth data (e.g., the true probability value for the corresponding portion of the cryptographic data). This comparison produces an error value that can be compared to a threshold to determine, in operation 357, whether a solution has converged to an acceptable value. If the error is less than the threshold, then the solution has converged and training is done. On the hand, if the error is greater than the threshold, then the training system reverts back to operation 353 to update the weights in the layers (e.g., using a back propagation process known in the art) and the inputs are applied again and the outputs are compared, by the discriminator, to the truth data and the process continues until the training is completed.

Figure 6:
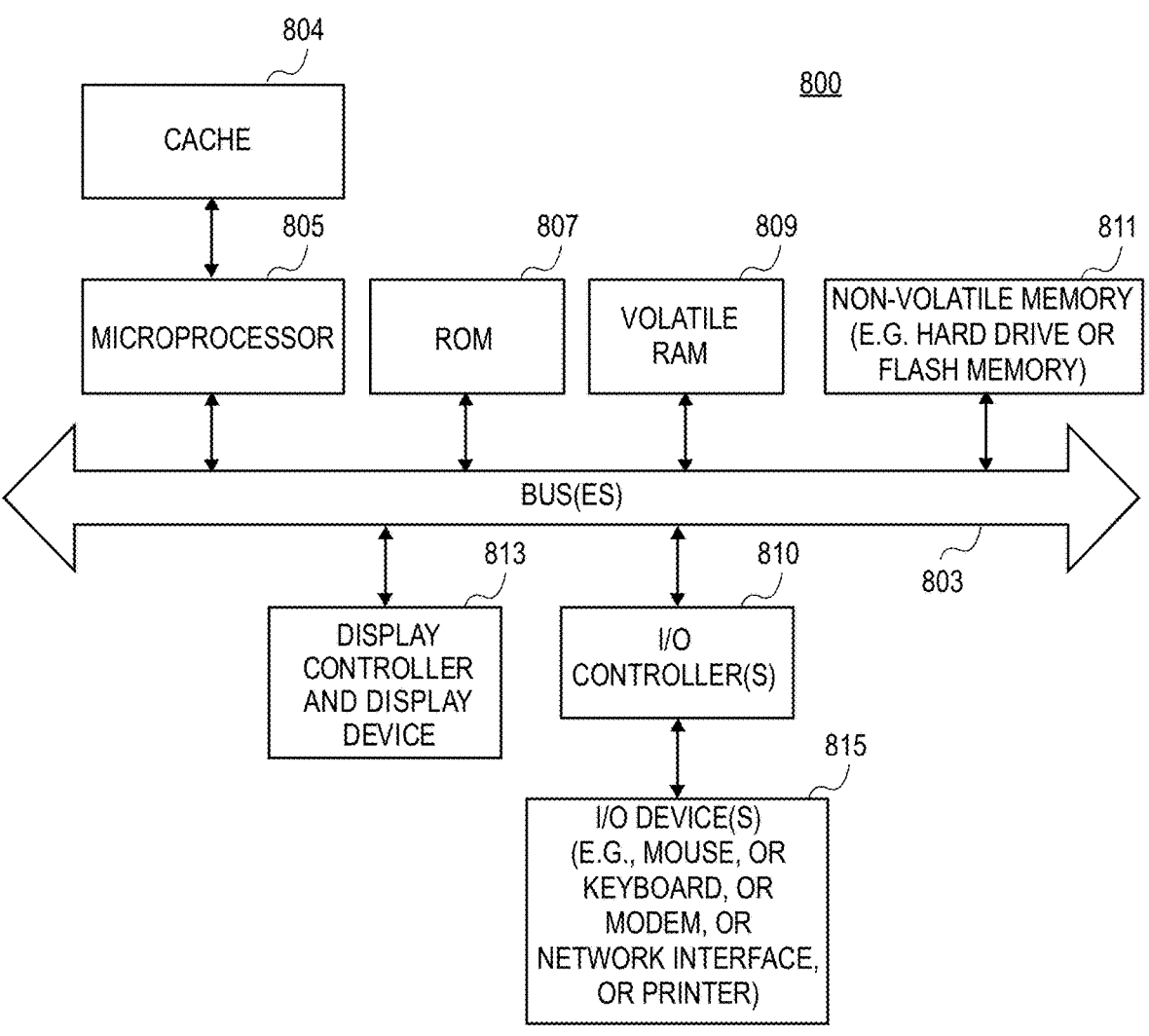
FIG. 6 shows an example of a data processing system that can be used to implement one or more embodiments described herein.

FIG. 6 shows one example of a data processing system 800, which may be used with one embodiment. For example, the system 800 may be implemented to provide a system or device that performs any one of the methods described herein. Thus, the system 800 is an example of a simulation system, and the system 800 can execute the simulation software described herein. Note that while FIG. 6 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 6, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 6 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMS, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method, the method comprising:

simulating a circuit processing cryptographic data to obtain a set of points of interest (POIs) in the simulated circuit, the cryptographic data including a plurality portions, and the set of POIs being associated with leakage data from the processing of the cryptographic data;

determining, within each POI in the set of POIs, a coupling impact of neighboring tiles relative to a center tile in each POI;

selecting a fusion pattern for each POI based on the determined coupling impact, the fusion pattern for each POI is used to statistically aggregate leakage data from each tile in the fusion pattern; and processing the leakage data with a plurality of neural networks, each neural network corresponding to a respective portion of the cryptographic data, the plurality of neural networks receiving the leakage data as inputs to predict probabilities of leakage for corresponding portions of the cryptographic data.

2. The non-transitory machine readable medium as in claim 1, wherein the method further comprises:

filtering the leakage data from the processing of the cryptographic data to derive the set of POIs which is less than all POIs found in the circuit.

3. The non-transitory machine readable medium as in claim 2, wherein the filtering comprises an image processing edge detection.

4. The non-transitory machine readable medium as in claim 1, wherein the simulating the circuit comprises:

providing through direct vector control at least a portion of the cryptographic data.

5. The non-transitory machine readable medium as in claim 1, wherein the leakage data comprises at least one of:

power noise data;

thermal data;

electromagnetic emission data; or tile-based power data when each POI in the set of POIs comprises a plurality of tiles, and wherein the leakage data includes temporal samplings during processing of the cryptographic data and spatial samplings over the circuit.

6. The non-transitory machine readable medium as in claim 1, wherein the plurality of neural networks comprise a first set of N neural networks, wherein the cryptographic data comprises N portions, and wherein each of the N neural networks is trained to identify a highest leakage POI for a corresponding portion of the cryptographic data.

7. The non-transitory machine readable medium as in claim 6, wherein the plurality of neural networks further comprise a second set of neural networks that receive leakage data of a plurality of the highest leakage POIs identified by the first set of N neural networks, and wherein the second set of neural networks is trained to generate a sensitivity score indicating a leakage sensitivity of a corresponding POI for each of the N portions of the cryptographic data.

8. The non-transitory machine readable medium as in claim 7, wherein the second set of neural networks is further trained to generate a set of probability scores indicating a probability that each of the N portions of the cryptographic data will be leaked by the circuit.

9. The non-transitory machine readable medium as in claim 7, wherein the second set of neural networks is further trained to generate a ranked list of a plurality of the sensitivity scores for the set of POIs.

10. A computer-implemented method for simulating leakage of sensitive data from a circuit, comprising:

simulating the circuit to process cryptographic data to obtain a set of points of interest (POIs) in the circuit, the cryptographic data including a plurality portions, and the set of POIs being associated with leakage data from the processing of the cryptographic data;

determining, within each POI in the set of POIs, a coupling impact of neighboring tiles relative to a center tile in each POI;

selecting a fusion pattern for each POI based on the determined coupling impact, the fusion pattern for each POI is used to statistically aggregate leakage data from each tile in the fusion pattern; and processing the leakage data with a plurality of neural networks, each neural network corresponding to a respective portion of the cryptographic data, the plurality of neural networks receiving the leakage data as inputs to predict probabilities of leakage for corresponding portions of the cryptographic data.

11. The method as in claim 10, further comprising:

filtering the leakage data from the processing of the cryptographic data to derive the set of POIs which is less than all POIs found in the circuit.

12. The method as in claim 11, wherein the filtering comprises an image processing edge detection.

13. The method as in claim 10, wherein the simulating the circuit comprises:

providing through direct vector control at least a portion of the cryptographic data.

14. The method as in claim 10, wherein the leakage data comprises at least one of:

power noise data;

thermal data;

electromagnetic emission data; or tile-based power data when each POI in the set of POIs comprises a plurality of tiles, and wherein the leakage data includes temporal samplings during processing of the cryptographic data and spatial samplings over the circuit.

15. The method as in claim 10, wherein the plurality of neural networks comprise a first set of N neural networks, wherein the cryptographic data comprises N portions, and wherein each of the N neural networks is trained to identify a highest leakage POI for a corresponding portion of the cryptographic data.

16. The method as in claim 15, wherein the plurality of neural networks further comprise a second set of neural networks that receive leakage data of a plurality of the highest leakage POIs identified by the first set of N neural networks, and wherein the second set of neural networks is trained to generate a sensitivity score indicating a leakage sensitivity of a corresponding POI for each of the N portions of the cryptographic data.

17. The method as in claim 16, wherein the second set of neural networks is further trained to generate a set of probability scores indicating a probability that each of the N portions of the cryptographic data will be leaked by the circuit.

18. The method as in claim 16, wherein the second set of neural networks is further trained to generate a ranked list of a plurality of the sensitivity scores for the set of POIs.

* * * * *